3,234,194
METHYL METHACRYLATE POLYMER-IN-MONOMER POLYMERIZATION IN THE PRESENCE OF A PEROXYMALEATE AND AN AMINE
Donald Hillman Slocum, Wilmington, Del., assignor to E. I. du Pont de Nemours and Company, Wilmington, Del., a corporation of Delaware
No Drawing. Filed June 12, 1963, Ser. No. 287,226
3 Claims. (Cl. 260—89.5)

This invention relates to a method of rapid polymerization of vinyl compounds. More specifically, this invention relates to the rapid polymerization of methyl methacrylate monomer and methyl methacrylate polymer-in-monomer solutions. Specifically, this invention relates to a new catalytic curing system for the polymerization of methyl methacrylate monomer and methyl methacrylate ploymer-in-monomer solutions. In its narrowest aspect, this invention relates to polymerizing methyl methacrylate monomer with monotertiary butyl peroxymaleate and an organic amine. It is known in the art to produce methyl methacrylate polymer-in-monomer solutions, see for example, British Patent No. 870,191, issued to Calkins et al. on June 14, 1961. Such polymer-in-monomer solutions have been cured by prior art processes by the addition of peroxy compounds, such as lauroyl peroxide and benzoyl peroxide. In an effort to increase the rate of polymerization of the various peroxide initiators, various amine compounds have been added. These compounds have, in fact, increased the polymerization rate, but they have other undesirable effects. Specifically, these compounds render the methacrylate much more susceptible to yellowing when exposed to sunlight.

It is an object of this invention to provide a method for polymerizing methyl methacrylate at extremely rapid rates with good initial color and good resistance to yellowing when exposed to sunlight. It is a further object of this invention to provide a polymer-in-monomer solution of methyl methacrylate that may be polymerized at very rapid rates by the addition of monotertiary butyl peroxymaleate. It is a further object of this invention to provide a methacrylate-containing mixture that polymerizes at very rapid rates at temperatures substantially less than the temperatures that prior art processes have been carried out.

These and other objects are obtained according to the present invention by adding to a polymer-in-monomer solution, such as that described in British Patent No. 870,191, issued to Calkins et al. on June 14, 1961, or to methyl methacrylate monomer, an aliphatic or aromatic amine and a hemiperester of a difunctional acid having the formula:

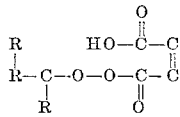

where R is an alkyl group having 1 to 3 carbon atoms. Processes for the production of these compounds are known in the art, for example, mono-tertiary butyl peroxymaleate may be made by the following reaction:

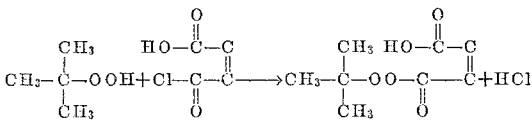

The amine should be present in the polymer-in-monomer solution or in the monomer, in the amount of between .1% and 1% by weight of the solution. The hemi-perester of a diffunctional acid should be present in the amount of greater than about .2% by weight of the polymer-in-monomer solution or monomer. The upper limit on the amount of hemi-perester present is not critical, but no additional advantages are obtained by adding more than about 6% by weight. The amine can be any primary, secondary, or tertiary amine that is soluble to the extent of at least .1% by weight, in the liquid to be polymerized.

In the following examples which illustrate the invention, all parts and percentages are in parts by weight except as otherwise specified

EXAMPLE I

To a solution of 25% methyl methacrylate homopolymer in methyl methacrylate monomer made by partial polymerization in situ was added 1% by weight of the peroxide initiator, mono-t-butyl peroxymaleate. To the resulting solution was added 0.1% triethyl amine in one case or 0.1% diethyl amine in another. The solutions were stirred and added to test tubes to a specified level. Gel times were measured at 40° C. and 60° C. on a Sunshine gel time meter. While a resin system containing peroxide with no amine added will show a gel time of 40 minutes at 60° C. and greater than 100 minutes at 40° C., the resin system containing 0.1% triethyl amine had gel times of 15 minutes at 60° C. and 26 minutes at 40° C. The resin system containing diethyl amine had gel times of 23 minutes at 60° C. and 35 minutes at 40° C. Not only was acceleration seen at 60° C., but the decrease in relative activity at 40° C. was much less in the amine accelerated systems than in an amine-free control.

EXAMPLE II

To a solution of 25% methyl methacrylate homopolymer in methyl methacrylate monomer was added 1% by weight t-butyl peroxymaleate and 0.1% of the aromatic amines specified in Table I. The gel times show various degrees of acceleration of the aliphatic peroxide by the aromatic amines from 15% to 60% faster.

*Table I*

60° C. GEL TIMES OF AMINE ACCELERATED CURES

| Amine: | 60° C. Gel time, minutes |
|---|---|
| Benyl amine | 24 |
| p-Anisidine | 16 |
| 2,4,6-trimethyl aniline (mesytidine) | 23 |
| N-methyl aniline | 32 |
| N-methyl p-toluidine | 24 |
| N,N-dimethyl p-toluidine | 33 |
| N,N-dimethyl p-anisidine | 25 |
| N,N-dimethyl 2,5-dimethoxyaniline | 34 |
| None | 40 |

EXAMPLE III

To a solution of methyl methacrylate containing 25% methyl methacrylate homopolymer and 1% ethylene glycol dimethacrylate was added 1% t-butyl peroxymaleate. To the resulting mixture 0.1% of either triethyl amine or diethyl amine was added. The resin poured into a cavity lined with cellophane and covered with another piece of cellophane film. The resin was polymerized at room temperature in one and one-half hours. The form stable castings were post-heated for 1 hour at 65° C. The initial yellowness of the castings was measured. The initial yellow color was ⅕ to ⅛ of that which is normal for aromatic amine acceleration of aromatic peroxide cures. After exposure to intense ultraviolet light for 2 weeks, the change in yellowness was from ⅓ to ¼ that evidenced with the all-aromatic cure systems.

EXAMPE IV

To a solution of methyl methacrylate containing 25% methyl methacrylate homopolymer and 1% ethylene glycol dimethacrylate was added 1% mono-t-butyl peroxymaleate. To the resulting mixture was added 0.1% of either p-anisidine or 2,4,6-trimethyl aniline. The resin was poured into a cavity lined with cellophane and covered with another piece of cellophane film. The resin was polymerized at room temperature in one and one-half hours. The castings were post-heated and then exposed for 2 weeks to high intensity ultraviolet light. The yellowness increase in the castings was ⅓ of that seen with aromatic amine acceleration of aromatic peroxide cure systems.

EXAMPLE V

To a solution of methyl methacrylate monomer containing 25% methyl methacrylate homopolymer was added 1% mono-t-butyl peroxymaleate. To the resulting solution was added 0.1% tetrakis-(N,N-dimethyl amino) ethylene. The mixture was placed in a test tube and the time to gel was measured on a Sunshine gel time meter. The time to gel was 9.9 minutes at 60° C. and 15.8 minutes at 40° C.

EXAMPLE VI

By the procedure described in Example III where the peroxide used was mono-t-butyl peroxymaleate with the amine tetrakis-(N,N-dimethyl amino) ethylene, a casting was prepared at room temperature. The cast sheet was exposed to intense ultraviolet light for two weeks. The change in yellowness from initial yellowness of 8 in the casting was 10 units. A casting made from 1% benzoyl peroxide and 0.1% N,N-dimethyl p-toluidine gave a yellowness change after a similar exposure of 31 units.

EXAMPLE VII

To a solution of methyl methacrylate monomer containing 25% homopolymer and 0.1% ethylene glycol dimethacrylate was added 1.0% mono-t-butyl peroxymaleate. To the resulting solution was added either 0.1% trimethyl amine or 0.07% tetrakis-(N,N-dimethyl amino) ethylene. The initiated resin solution was used to impregnate fiberglass reinforcing mat. A laminated structure containing 25% glass by weight was produced after the resin had cured. The cure time was 34 minutes and 21 minutes, respectively, for the amine accelerators described above. The initial yellowness in both cases was about 25% to 50% greater than that obtained with mono-peroxide cured laminates. After exposure to intense ultraviolet light, the change in yellowness with the triethyl amine catalyzed system was 12 units while the change with the tetrakis-(N,N-dimethyl amino) ethylene catalyzed system was 8 units.

The yellowness of the samples tested in the above examples was calculated on the basis of the following equation:

$$YI = \frac{128x - 106z}{y}$$

where YI is the yellow index, $x$, $y$ and $z$ are the CIE tristimulus values for CIE Illuminant C (daylight). Ref.: Commission Internationale d'Eclairage (International Commission on Illumination), 1931.

Various cross-linking agents, such as ethylene glycol dimethacrylate, methylene glycol dimethacrylate, and various light stabilizers, such as benzophenones and benzotriazoles, may be present in the polymerization mixture. In addition to the reinforcing material disclosed in Example VII, other reinforcements may be present in the polymerization mixture, such as synthetic and natural fibers, also fillers, dyes, pigments, and the like.

I claim:
1. A process of polymerizing a polymer-in-monomer solution of polymethylmethacrylate dissolved in methylmethacrylate which comprises adding between 0.2% and 6% by weight of a peroxide having the formula:

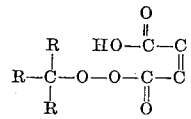

where R is an alkyl group having 1 to 3 carbon atoms and 0.1% to 1% by weight of a trialkyl amine and polymerizing the polymer-in-monomer solution.

2. The process of claim 1 in which the peroxide is mono-tertiary-butyl peroxymaleate and in which the trialkyl amine is triethyl amine.

3. A process of polymerizing a polymer-in-monomer solution of polymethylmethacrylate dissolved in methylmethacrylate which comprises adding between 0.2% and 6% by weight mono-teriary-butyl peroxymaleate and 0.1 to 1% by weight tetrakis-(N,N-dimethyl amino) ethylene and polymerizing the polymer-in-monomer solution.

References Cited by the Examiner

UNITED STATES PATENTS

| | | | |
|---|---|---|---|
| 2,744,886 | 5/1956 | Protzman | 260—89.5 |
| 2,779,751 | 1/1957 | Bredereck | 260—89.5 |
| 3,154,600 | 10/1964 | Munn | 260—89.5 |

FOREIGN PATENTS 1,068,467  11/1959  Germany.

JOSEPH L. SCHOFER, *Primary Examiner.*

DONALD E. CZAJA, *Examiner.*